(12) United States Patent
Sack

(10) Patent No.: US 7,586,207 B2
(45) Date of Patent: Sep. 8, 2009

(54) WATER WAVE POWER SYSTEM

(75) Inventor: James A. Sack, Elverson, PA (US)

(73) Assignee: Kinetic Wave Power, Midland, MI (US)

( * ) Notice: Subject to any disclaimer, the term of this patent is extended or adjusted under 35 U.S.C. 154(b) by 84 days.

(21) Appl. No.: 11/950,695

(22) Filed: Dec. 5, 2007

(65) Prior Publication Data

US 2009/0146428 A1 Jun. 11, 2009

(51) Int. Cl.
*F03B 7/00* (2006.01)
(52) U.S. Cl. .................. 290/53; 290/54; 415/7
(58) Field of Classification Search ............... 290/53, 290/54; 415/7
See application file for complete search history.

(56) References Cited

U.S. PATENT DOCUMENTS

| | | | | |
|---|---|---|---|---|
| 3,687,567 A | * | 8/1972 | Lininger | 415/7 |
| 3,987,307 A | * | 10/1976 | Giconi | 290/1 D |
| 4,034,231 A | * | 7/1977 | Conn et al. | 290/53 |
| 4,184,584 A | | 1/1980 | Dehlen | |
| 4,219,304 A | | 8/1980 | Schock | |
| 4,279,124 A | | 7/1981 | Schremp | |
| 4,296,602 A | * | 10/1981 | Hales et al. | 60/398 |
| RE31,449 E | * | 11/1983 | Crider | 290/43 |
| 4,440,427 A | * | 4/1984 | Felton | 290/54 |
| 4,446,378 A | | 5/1984 | Martinez Parra | |
| 4,521,152 A | | 6/1985 | Henrikson | |
| 4,686,376 A | * | 8/1987 | Retz | 290/42 |
| 4,737,070 A | | 4/1988 | Horiuchi et al. | |
| 6,168,373 B1 | | 1/2001 | Vauthier | |
| 6,210,113 B1 | | 4/2001 | Ihrenberger | |
| 6,406,251 B1 | | 6/2002 | Vauthier | |
| 6,954,006 B2 | | 10/2005 | Williams, Jr. | |
| 7,011,501 B2 | | 3/2006 | Lindberg | |
| 7,105,942 B2 | | 9/2006 | Henriksen | |
| 7,222,487 B1 | * | 5/2007 | Hinkley | 60/639 |
| 7,521,816 B2 | * | 4/2009 | Helfrich | 290/54 |
| 2009/0102199 A1 | * | 4/2009 | Voropaev | 290/53 |

OTHER PUBLICATIONS

Fax from Michael S. Lee of Apr. 24, 2009.*

* cited by examiner

*Primary Examiner*—Joseph Waks
(74) *Attorney, Agent, or Firm*—Plumsea Law Group, LLC

(57) ABSTRACT

A system for generating energy using water waves includes a unit having two rotors connected by a ramp. The unit is positioned at or near the surface of a body of water and oriented so that the waves break on the ramp and travel along the length of the ramp. Each rotor is provided with a plurality of buckets having an open top and a bottom having a opening. The opening is sealed by a flap when water enters through the top of the bucket, but is open when water enters or attempts to enter the bucket through the opening. As the water travels along the ramp, the water is fed into the buckets on the rotors to turn the rotors and drive generators positioned at both ends of the rotors. The energy is transmitted to an external collection point for use or distribution.

25 Claims, 11 Drawing Sheets

WATER WAVE POWER SYSTEM

BACKGROUND OF THE INVENTION

1. Field of the Invention

The present invention relates to an alternative energy source. More specifically, the present invention is a generator system for converting water wave power to electricity.

2. Description of Related Art

The world consumption of electricity in 2007 is estimated by the U.S. Energy Information Administration to be about 16.33 trillion kilowatt-hours (kWh). In the United States, the world's largest consumer of electricity, annual consumption is nearly 4 trillion kWh. Consumption is rapidly increasing world-wide. As demand increases, the cost of electricity also increases. Since 2000, the retail price for electricity has increased by between 2-4 percent per year.

Most electricity in the U.S. is generated using non-renewable resources, such as coal (52 percent of generation), nuclear (21 percent), and natural gas (16 percent). The use of renewable resources represents only about 8 percent of the electricity generation in the U.S., with hydroelectric power from rivers accounting for most of the generation.

The burning of fossil fuels such as coal to generate electricity is a major contributor to many environmental ills, such as greenhouse gas emissions, acid rain, and air pollution. Additionally, as fossil fuels are non-renewable, the depletion of the world's reserves of fossil fuels for electricity generation is believed to contribute significantly to the rapidly increasing cost of retail electricity. Therefore, there is increasing interest in developing alternative energy sources, such as wind, solar, and ocean wave technologies. It is estimated that harnessing less then 0.2 percent of the mechanical energy generated by ocean waves and currents could fulfill all of the world's electricity demand.

Many technologies have attempted to capture and harness the energy in ocean waves. Many of these technologies are based upon air turbine technologies, such as windmills. The size of windmills has slowed their adoption as an alternative energy generation technology, as the windmills are considered to be unsightly. However, as the density of water is approximately 1000 times that of air, the power conversion devices for water technologies have the potential to be more efficient and correspondingly more compact.

Some technologies utilize tethered buoys that rise and fall with the motion of the ocean waves at the surface. The up-and-down motion of the buoys is used to drive a generator, such as a turbine or electromagnetic generator. Other technologies utilize no moving parts, but channel the waves into reservoirs to drive hydroelectric turbines or allow the passing waves to manipulate the pressure of air trapped in channels to drive turbines. Many conventional wave power extraction systems only work in relatively high waves, making the systems impractical for many areas with low or inconsistent wave heights. For example, most of the eastern seaboard in the U.S. would not be able to utilize these types of technologies.

Yet another known technology relies upon well-known water wheel systems. Long used in rivers to generate power, water wheels are covered in vanes that are partially submerged in a continuous current. The water driven by the current pushes against the flat planes of the vanes to turn the wheel. This force causes the wheel to turn. In slower rivers, the water is diverted to the top of the wheel so that the force of gravity may be added to the force from the current in turning the wheel.

Adapting water wheel technology to the oceans has proven difficult for a variety of reasons. First, the intermittent nature of ocean waves makes continuously turning a water wheel difficult to achieve. Second, the breaking of the ocean waves can swamp the water wheel, imparting force to vanes on all sides of the water wheel. No force imbalance is created, so the water wheel does not spin. Further, many of these technologies only work in relatively high waves, making the systems impractical for many areas with low or inconsistent wave heights. Finally, the directionality of the ocean waves change over time, sometimes even over the course of a day. Keeping the water wheel aligned with the oncoming waves is critical to efficient operation, but alignment can be difficult to achieve, especially in choppy seas.

Technologies exist that attempt to address these difficulties. For example, U.S. Pat. No. 4,296,602 to Hanes et al., incorporated herein by reference, discusses an elongated water wheel rotatably mounted to a support structure that includes a concrete foundation pad on the seabed. The perimeter of the water wheel includes a plurality of bucket-like vanes, with a portion of the vanes submerged. A ramp is disposed on the wave side of the wheel and extends from just beneath the surface to the top of the water wheel, essentially shielding the water wheel from the impact of the waves. A holding tank is provided at the top of the ramp and above the water wheel. As waves encounter the device, the waves impact the ramp so that the water is driven up the ramp and into the holding tank. The holding tank directs the water to the vanes of the water wheel, imparting a force on the vanes. The water wheel rotates in response to the force. Energy is extracted from the rotating wheel by a generator or similar device.

There remains a need in the art for a system that efficiently extracts energy from a wide range of ocean wave heights at low cost and without the need for significant and unsightly structures.

SUMMARY OF THE INVENTION

A system and method for extracting water wave energy to generate electricity is provided. In one aspect, a system and method for converting water wave energy to electricity comprises a first rotor having a first plurality of water receptacles attached to a first rotor cylinder, the first rotor configured to rotate in a first direction when a critical number of water receptacles receive water from a water wave, each water receptacle having an open top and a hinged flap on an opposite side to the open top, the hinged flap configured to seal an opening formed in the opposite side if water enters the receptacle through the open top and to open if water attempts to enter the receptacle through the opening; a first generator connected to the first rotor and configured to convert the rotational energy of the first rotor into electricity; and a transmission line connected to the first generator and configured to transfer the electricity to an external collection area.

In another aspect, the system comprises a second rotor having a second plurality of water receptacles attached to a second rotor perimeter, the second rotor configured to rotate in a second direction when the critical number of the second plurality of water receptacles receive water from a water wave, each water receptacle having an open top and a hinged flap on an opposite side to the open top, the hinged flap configured to seal if water enters the receptacle through the open top and to open if water attempts to enter the receptacle through the opposite side, a second generator connected to the second rotor and configured to convert the rotational energy of the second rotor into electricity, the transmission line being connected to the second generator, and a ramp positioned between and connected to the first rotor and the second rotor.

In another aspect, the first rotor and the second rotor are connected to the ramp so that a first angle is formed between the first rotor and the second rotor.

In another aspect, the first rotor and the second rotor are connected to the ramp so that a first end of the ramp and a second end of the ramp are open to the flow of water.

In another aspect, the first rotor and the second rotor are connected to the ramp at a second angle so that the ramp forms an incline between the rotors In another aspect, the first direction is opposite to the second direction.

In another aspect, the first rotor and the second rotor are substantially similar.

In another aspect, the first generator is connected to the first rotor by a first drive driveshaft and the second generator is connected to the second rotor by a second drive driveshaft.

In another aspect, at least one of the first rotor or the second rotor is connected to a third generator by a third drive driveshaft.

In another aspect, each rotor is connected to two generators.

In another aspect, the transmission line connects the rotor to an energy collection and distribution center.

In another aspect, the water receptacles are arranged on the cylinder in rows.

In another aspect, the rows form a spiral pattern on the cylinder.

In another aspect, the first rotor is connected to the second rotor by at least one driveshaft.

In another aspect, the invention provides a bucket for a water wheel comprising an open top configured to allow water to flow into the bucket a first side opposite the open top, and a flap hingedly attached to the first side, the flap configured to seal an opening formed in the first side if water enters the bucket through the open top and to open if water attempts to enter the receptacle through the opening.

In another aspect, the bucket has a substantially cubical shape.

In another aspect, at least one hinge attaches the flap to the first side.

In another aspect, the hinge comprises an elastomeric material.

In another aspect, the flap has a quadrilateral shape.

In another aspect, an elastomeric hinge is provided on each side of the quadrilateral flap.

In another aspect, the flap comprises a rigid material.

In another aspect, the flap includes an elastomeric material.

In another aspect, the flap comprises a flexible material.

In another aspect, the bucket is fixedly attached to a water wheel cylinder.

In another aspect, the invention provides a method for generating energy using water waves comprising positioning a turbine unit at or near a water surface, the turbine unit comprising a first rotor having a first plurality of buckets attached to a first rotor cylinder, a second rotor having a second plurality of buckets attached to a second rotor cylinder, and a ramp connected to and positioned between the first rotor and the second rotor, orienting the turbine unit so that a first end of the ramp is exposed to an oncoming wave, capturing at least a portion of the oncoming wave so that water associated with the oncoming wave travels along the ramp to be fed into at least one of the first or second plurality of buckets to create a weight imbalance on at least one of the first or second rotors to cause at least one rotor to turn; and driving a generator with the at least one turning rotor to generate energy.

In another aspect, the turning rotor drives a driveshaft.

In another aspect, the energy generated by the generator is transmitted to an external collection point via a transmission line.

In another aspect, the turbine unit is anchored with the transmission line.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
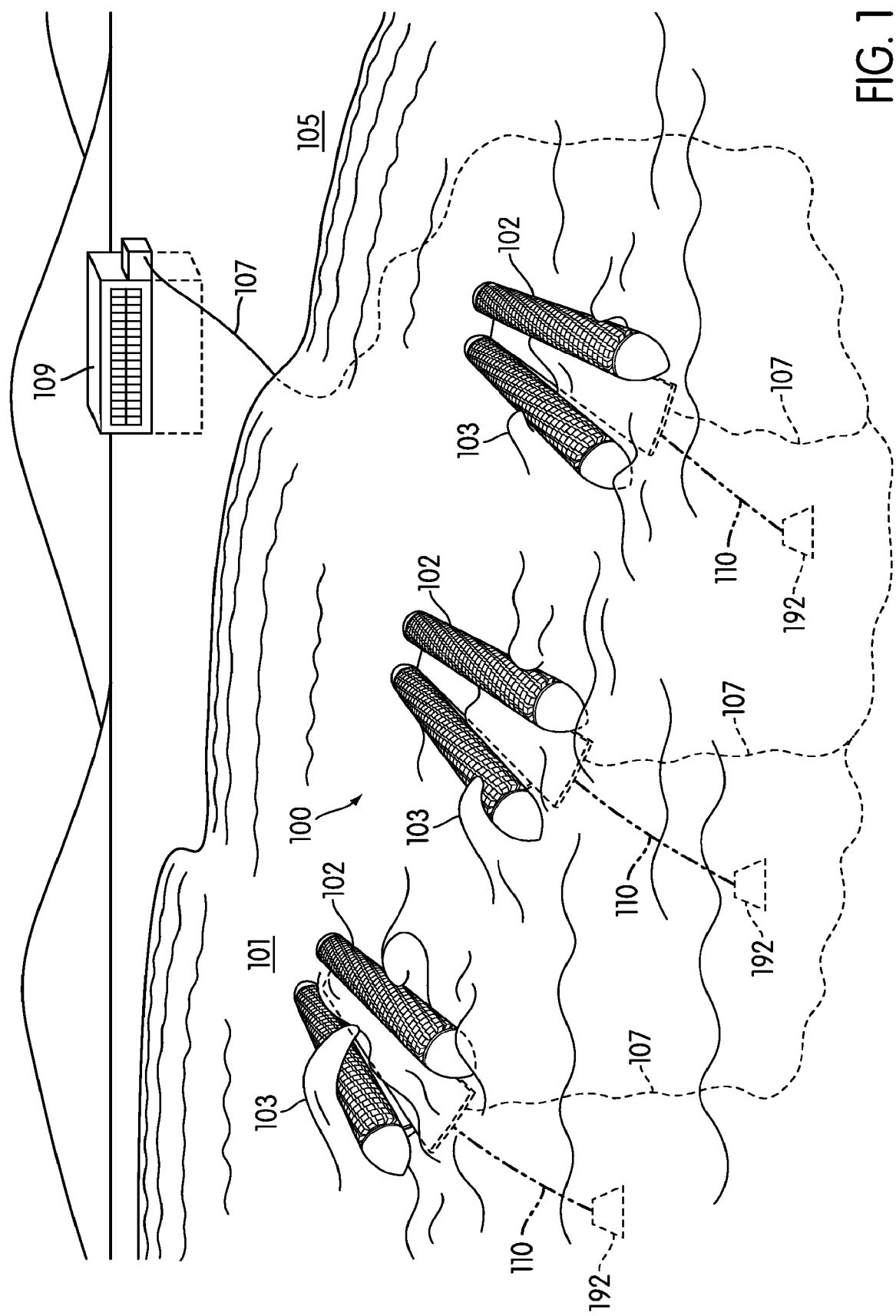
FIG. 1 is a schematic view of a generator system according to the invention shown in situ near a shoreline.

A system 100 for extracting energy from water waves and converting that energy to usable electricity is shown in FIG. 1. System 100 generally includes at least one turbine unit 102 floating in waves 103 at or near a water surface 101 connected to an energy collection and distribution center 109 via a transmission line 107. Water surface 101 is preferably the surface of an ocean, but in other embodiments may be the surface of a lake, sea, or any body of water capable of generating waves 103.

Turbine unit 102 may be positioned anywhere water waves travel. Turbine unit 102 is preferably positioned near a shore 105 to minimize the transmission distance from turbine unit 102 to energy collection and distribution center 109. In one embodiment, turbine unit 102 is positioned about one to three miles offshore so that turbine unit 102 can easily transfer the energy it generates to energy collection and distribution center 109 without easily being seen by the naked eye from shore 105. In other embodiments, turbine unit 102 may be positioned closer to shore or further offshore. Energy collection and distribution center 109 may be a building on shore 105, as shown, such as a power transfer station, an offshore structure such as a platform, or even a boat carrying rechargeable batteries. In one embodiment, at least a portion of distribution center 109 is underground. Preferably, distribution center 109 is mainly positioned underground with only a small portion above-ground, so as to preserve the vistas of the coastal area.

In a preferred embodiment, system 100 includes multiple turbine units 102. For example, in the embodiment shown in FIG. 1, three turbine units 102 are provided. Any number of turbine units 102 may be provided, limited by such factors as the available near-shore area, the desired energy output, and the like.

Preferably, each turbine unit 102 floats on or near surface 101 and is attached by a tether 110 to the seabed or to a man-made structure affixed to or embedded within the seabed. In other embodiments, tether 110 may be eliminated if turbine unit 102 is provided with a propulsion system, such as an on board motor, and a remote guidance system, such as a global positioning system. Tether 110 may be made of any strong but flexible material, such as braided or twisted metal cable covered with a salt-water resistant coating, chain link metal, or the like. However, in one embodiment, tether 110 is made from a high power transmission cable so that tether 110 can be used as both an anchor for turbine unit 102 and a connection to a transmission line 107 that transfers the power generated by turbine units 102 to energy collection and distribution center 109. Multiple tethers 110 may be combined into a single transmission line 107 to transfer power to energy collection and distribution center 109. Transmission line 107 is preferably a high power undersea transmission cable that runs along the seabed. Transmission line 107 may include multiple branches that extend to each turbine unit 102 from a trunk line, or in another embodiment, each unit 102 may feed a transmission line 107 to a transfer or junction box that feeds a single line to collection center 109.

Preferably, tether 110 extends away from turbine unit 102 at an acute angle, as shown. Additionally, tether 110 is preferably sufficiently long so that tether 110 is not pulled taut. This slack in tether 110 allows turbine unit 102 to displace vertically with waves 103 and/or the tides without damaging tether 110 or dislodging tether 110 from the seabed. The vertical displacement of turbine unit 102 maintains turbine unit 102 at or near surface 101. In one embodiment, tether 110 is connected to an anchor 192 embedded or otherwise attached to the ocean or sea floor. Each unit 102 may be attached to a dedicated anchor 192, as shown, or a single anchor 192 may be provided for use with multiple units 102. Anchor 192 may be any type of anchoring device capable of maintaining the position of turbine unit 102. In one embodiment, anchor 192 is a cement or concrete block embedded into the ocean or sea floor. Anchor 192 may include attachment elements 191, such as metal rings, or tether 110 may be affixed directly to the concrete block, such as with an adhesive or by embedding tether 110 into anchor 192.

In positioning turbine units 102 with respect to one another in an embodiment having multiple units, preferably turbine units 102 are placed and tethered sufficiently far apart so as to accommodate the sweep angle of the turbine unit 102. In other words, as each turbine unit 102 moves about tether 110, the adjacent turbine units 102 are positioned so that no collisions occur.

Figure 2:
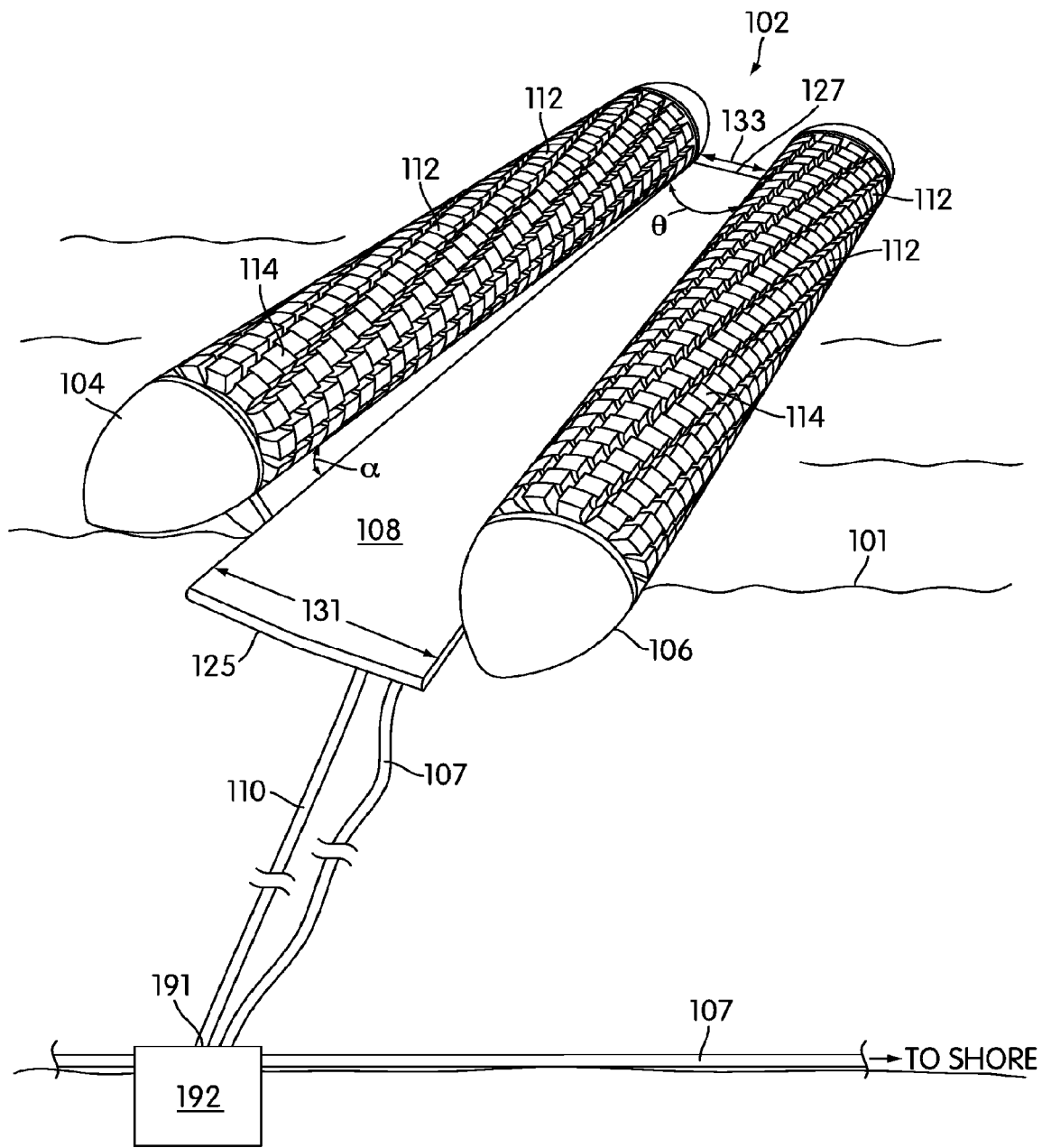
FIG. 2 is a schematic perspective view of a single generator unit shown tethered to a sea bed.
Figure 3:
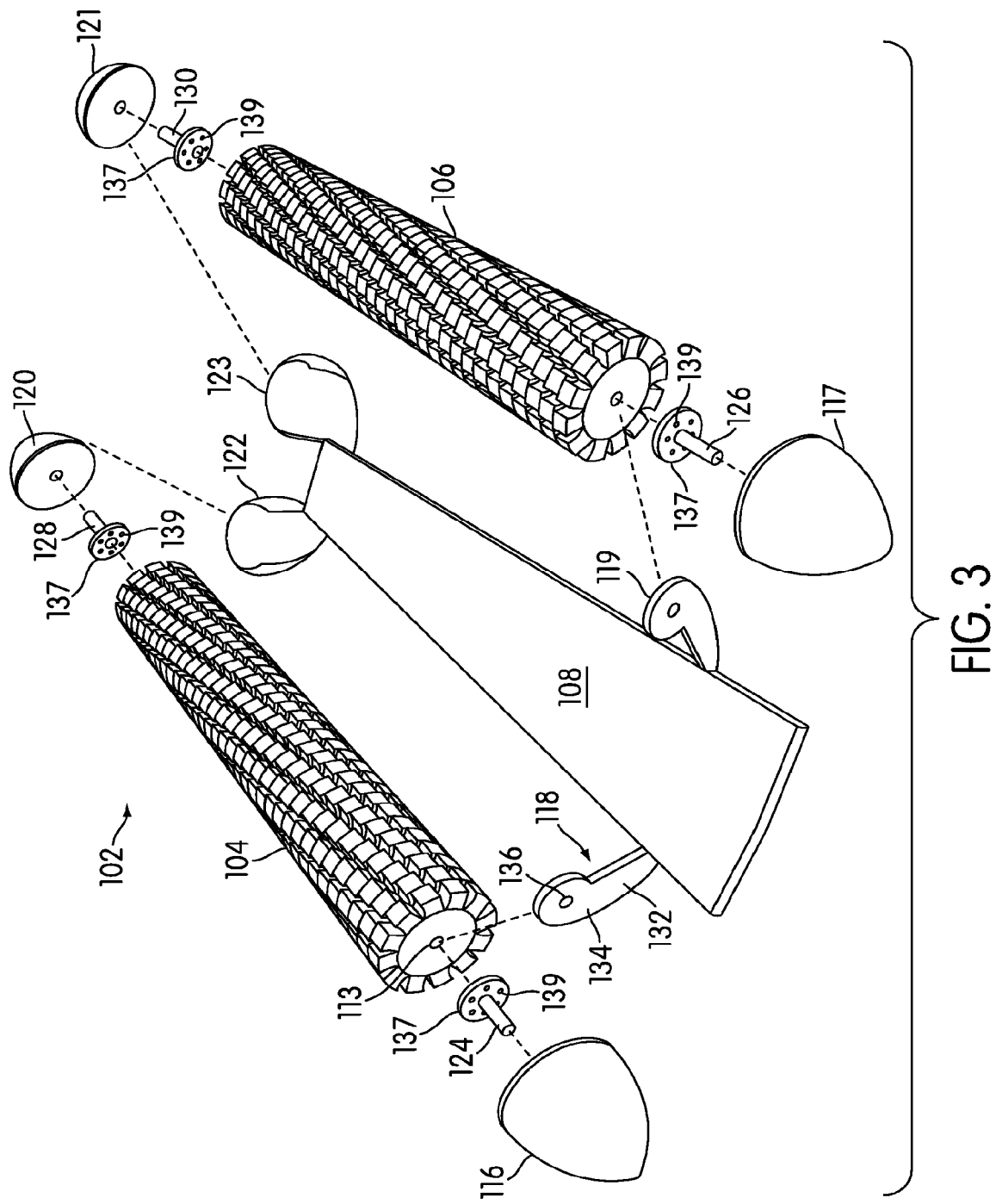
FIG. 3 is a schematic exploded view of the generator unit shown in FIG. 2.
Figure 4:
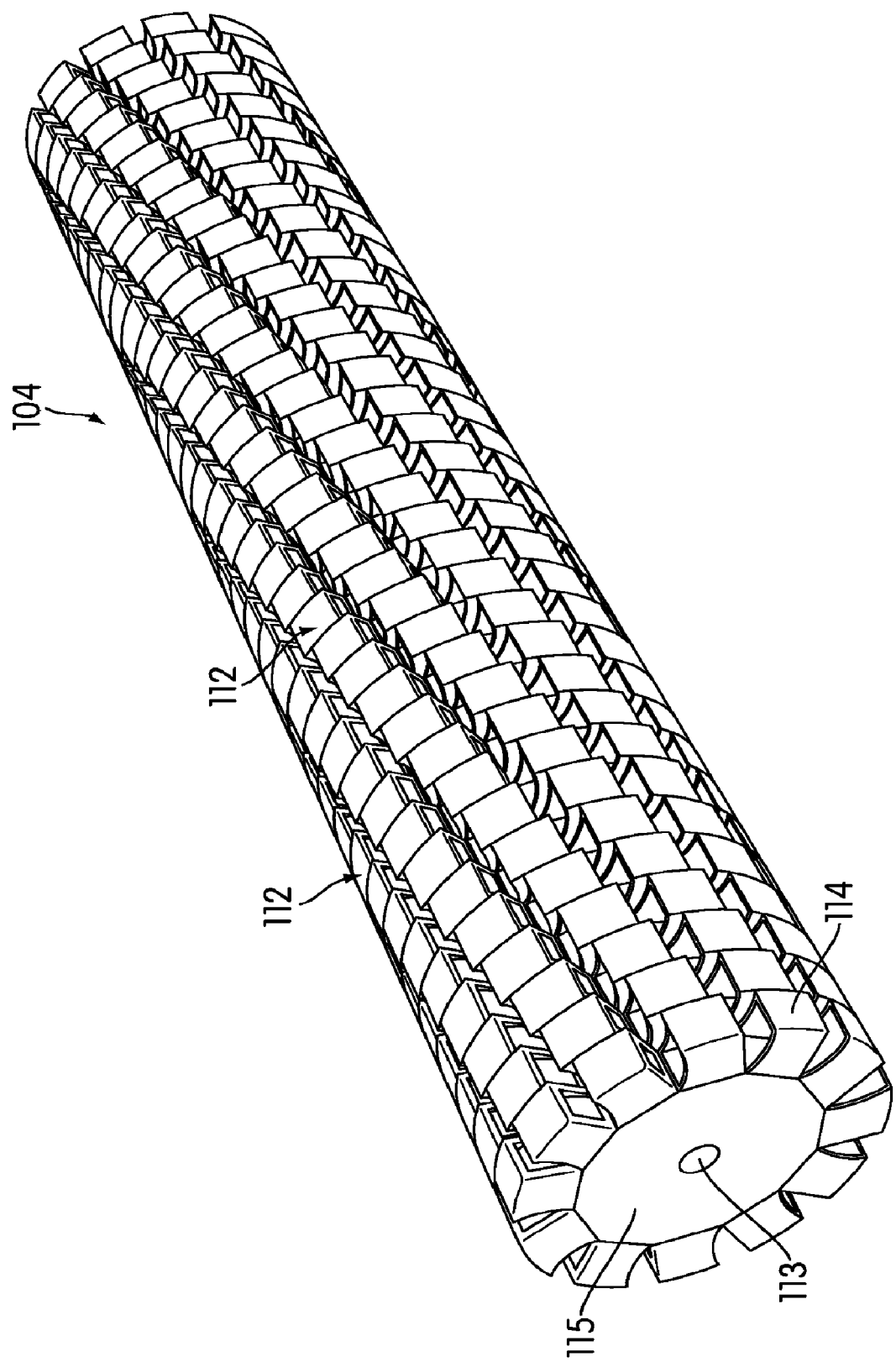
FIG. 4 is a schematic perspective view of a rotor of the generator unit.
Figure 5:
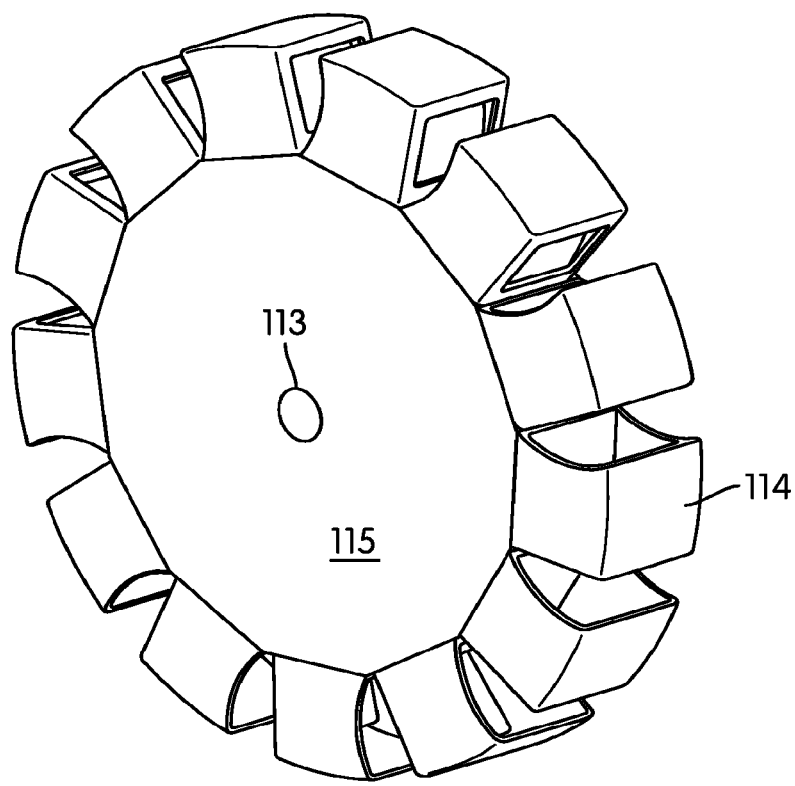
FIG. 5 is a schematic perspective view of a rotor section of the rotor having a plurality of buckets attached to the rotor section.

As shown in FIGS. 2 and 3, turbine unit 102 generally includes a first rotor 104 and a second rotor 106 rotatably mounted to a ramp 108. As shown in FIG. 4, first rotor and second rotor 106 are generally elongated cylinders 115 having a plurality of buckets 114 fixedly attached to the outer surfaces of first and second rotors 104 and 106. Buckets 114 are water-receiving receptacles arranged so that buckets 114 may be intermittently filled by waves 103.

Ramp 108 is preferably a plank or plank-like member made of an ocean-environment durable material, such as stainless steel or concrete. First rotor 104 and second rotor 106 are mounted to ramp 108 at an angle $\alpha$ such that ramp 108 is inclined between a first end 125 of turbine unit 102 and a second end 127 of turbine unit 102. Throughout this discussion, points at or near first end 125 are "proximal" and points at or near second end 127 are termed "distal". In some embodiments, ramp 108 may also have a curvature across its width, i.e., in the dimension from first rotor 104 to second rotor 106.

Preferably, turbine unit 102 is oriented on surface 101 so that the water driven by any particular wave 103 (shown in FIG. 1) encounters first end 125 and at least a portion of wave 103 travels toward second end 127 along ramp 108. As the water travels along ramp 108, the water is delivered to rampside buckets 114.

In one embodiment, as shown in FIG. 2, at least a portion of ramp 108 near first end 125 may be submerged beneath surface 101. However, in other embodiments, turbine unit 102 is designed to have neutral buoyancy at surface 101 so that all or substantially all of ramp 108 is submerged while approximately one-half of rotors 104 and 106 are submerged. Materials choices and the use of ballast may assist in achieving this floatation scenario. For example, ramp 108 may be made of reinforced concrete with a neutral buoyancy beneath surface 101 while rotors 104 and 106 may be made of a significantly lighter material having a tendency to float at surface 101, such as concrete-coated foam, fiber wound thermoset plastics, or steel. Combining these two buoyancies into a single unit achieves the desired overall buoyancy.

Ramp 108 may extend straight across between rotors 104 and 106. Alternatively, ramp 108 may be curved between rotors 104 and 106. Ramp 108 preferably has a smoothly tapered width from first end 125 to second end 127, although in other embodiments ramp 108 may be uniform or substantially uniform in width. For example, ramp 108 preferably has a first width 131 at or near first end 125 and a second width 133 at or near second end 127. First width 131 is preferably greater than second width 133. This tapered geometry for ramp 108 allows first rotor 104 and second rotor 106 to form an angle $\theta$ with respect to each other. In other words, the arrangement of first rotor and second rotor 106 essentially forms a V-shape, with the open end of the V facing the oncoming waves 103. This shape funnels the water delivered by waves 103 into turbine unit 102 and, subsequently, to individual rotors 104 and 106 and buckets 114. As shown in FIG. 1, any wave encountering turbine unit 102 travels up ramp 108 and exits through a gap between first rotor 104 and second rotor 106 at second end 127. This gap also allows any sea life or debris to exit turbine unit 102.

Another benefit of the V-shape is that the height of the water transported along ramp 108 does not substantially diminish as the water travels along ramp 108, even though some volume of the water is lost to buckets 114. Maintaining the height of the water traveling along ramp 108 increases the likelihood that buckets 114 near second end 127 of turbine unit 102 are filled, as the height of the water is more likely to spill over the lip of the distal buckets 114.

First rotor 104 and second rotor 106 are water-driven rotor units configured to turn first proximal driveshaft 124, first distal driveshaft 128, second proximal driveshaft 126, and second distal driveshaft 130. Driveshafts 124, 126, 128, and 130 are preferably made from a metal material resistant to the deleterious effects of the salty and wet ocean environment, such as stainless steel. Driveshafts 124, 126, 128, and 130 are preferably cylindrical in shape and fixedly attached to rotors 104 and 106. Driveshafts 124, 126, 128, and 130 may be attached to rotors 104 and 106 using any method known in the art, but in one embodiment are welded or bolted to cylinder 115 in the vicinity of opening 113.

As shown in FIG. 3, first and second proximal driveshafts 124 and 126 and first and second distal driveshafts 128 and 130 are configured to be inserted into openings 113 provided to cylinder 115 (shown in FIG. 4.) As shown in FIG. 3, first and second proximal driveshafts 124 and 126 and first and second distal driveshafts 128 and 130 are somewhat shortened, so that each driveshaft extends only a short distance into first rotor 104 or second rotor 106. Therefore, opening 113 need only extend a short distance into cylinder 115. However, in other embodiments, each rotor 104 and 106 may be provided with a single driveshaft that extends entirely through rotors 104 and 106. In such an embodiment, opening 113 extends entirely through cylinder 115. In other embodiments, not shown, opening 113 may be eliminated entirely. In these embodiments, driveshafts 124, 126, 128 and 130 are preferably provided with a lip or flange that may be welded or bolted to cylinder 115.

Each of driveshafts 124, 126, 128, and 130 are rotatably attached to a power generation unit (not shown) capable of using the mechanical energy of rotating driveshafts 124, 126, 128, and 130 to generate electricity. The power generation units may be any type of power generation unit known in the art capable of generating electricity from turning driveshafts, such as gear boxes or transmissions, mechanical drives, coupled electricity generators, controlled frequency converters, and gearless electricity generators. The power generation unit may be an alternating current generator or a direct current generator. An alternating current generator may generate power capable of being used directly by many power distribution systems. A direct current generator may generate power capable of ready synchronization with other direct current generators in the system, for example, when many turbine units 102 are provided as a generator farm.

The power generating units are preferably housed within first proximal enclosure 116, second proximal enclosure 117, first distal enclosure 120, and second distal enclosure 121 so that each rotor is provided with two power generators. In other embodiments, only one power generator is provided per rotor. Tether 110 is preferably connected to all enclosures 116, 117, 120, and 121 to transfer electricity generated by the power generation units to transmission line 107.

Enclosures 116, 117, 120, and 121 are housing units configured to receive the power generation units and to which rotors 104 and 106 are rotatably attached via driveshafts 124, 126, 128, and 130. Driveshafts 124, 126, 128, and 130 may be provided with plates 137 to readily attach driveshafts 124, 126, 128, and 130 to rotors 104 and 106. Holes 139 may be provided in plates 137, with holes 139 configured to receive a bolt, screw, or similar fastener to fixedly attach driveshafts 124, 126, 128, and 130 to rotors 104 and 106. Alternatively, plates 137 may be affixed to rotors 104 and 106 using any method known in the art, such as by welding or using an adhesive.

Driveshafts 124, 126, 128, and 130 are inserted into openings in enclosures 116, 117, 120, and 121 and longitudinally secured, such as by attachment to the power generation units. Optionally, driveshafts 124, 126, 128, and 130 may be surrounded by a bearing at the attachment point to provide smooth motion by maintaining the concentric positioning of driveshafts 124, 126, 128, and 130. Each enclosure 116, 117, 120, and 121 is a streamlined hollow member made of a material substantially impervious to the destructive effects of the ocean environment. For example, enclosures 116, 117, 120, and 121 may be made from stainless steel, plastics, composite materials, and ceramics. In one embodiment, at least one portion of at least one enclosure is integrated into ramp 108.

Rotors 104 and 106 are also rotatably attached to ramp 108 via mounts 118, 119, 122, and 123. First proximal mount 118 secures rotor 104 at first proximal driveshaft 124 to ramp 108, and second proximal mount 119 secures second rotor 106 at second proximal driveshaft 126 to ramp 108. Preferably, first proximal mount 118 and second proximal mount 119 are substantially similar in configuration. First proximal mount 118 and second proximal mount 119 is preferably made from the same or similar material as that of ramp 108. Each proximal mount 118 and 119 optionally includes an arm 132 fixedly attached to ramp 108, such as by welding or with mechanical fasteners such as bolts. Each proximal mount 118 and 119 also includes a bulbous portion 134 configured to be attached to rotors 104 and 106. Bulbous portion 134 is preferably a flattened plate with a center opening 136 configured to accommodate driveshaft 124 or driveshaft 126.

Similarly, first distal mount 122 secures first rotor 104 to ramp 108, and second distal mount 123 secures second rotor 106 to ramp 108. Preferably, first distal mount 122 forms a wall of first distal enclosure 120 and second distal mount 123 forms a wall of second distal enclosure 121. First distal mount 122 and second distal mount 123 are preferably streamlined hollow members fixedly attached to ramp 108, such as by welding or by being co-formed with ramp 108. Preferably, first distal mount 122 and second distal mount 123 are formed of the same or similar material as enclosures 120 and 121.

First rotor 104 and second rotor 106 are preferably substantially similar in size, shape, and construction, although first rotor 104 and second rotor 106 are configured to turn in opposite directions. While turbine unit 102 may be used with a single rotor, stabilizing a single rotor turbine unit may be difficult as the turning of the rotor on a floating unit causes the unit to yaw on the surface or roll on the surface without generating power. A single turning rotor tends to yaw on surface 101 in one direction in reaction to the torque. An oppositely turning rotor tends to yaw on surface 101 in the opposite direction. Therefore, oppositely turning rotors of similar size force balance each other, eliminating or nearly eliminating the tendency of turbine unit to yaw on surface 101. In an alternate embodiment, two rotors may be configured to turn in the same direction, with a gearbox positioned between the rotors turning in the opposite direction.

While the dimensions of first rotor 104 and second rotor 106 and buckets 114 may be selected to best suit the deployment location or provide a desired power output, in one exemplary embodiment, rotors 104 and 106 are approximately 81 feet in length. In this exemplary embodiment, cylinder 115 is approximately 10 feet in diameter having approximately 16 bucket rows 112 of substantially cubical buckets 114. Cylinder 115 may optionally have flattened portions on an outer surface to more easily secure cubical buckets 114 to cylinder 115. This would allow the diameter of cylinder 115 to be increased in discrete, bucket-dimensioned units for modularity. Each bucket 114 is approximately 2 feet on a side. Preferably, the length of rotors 104 and 106 is selected based upon the prevailing wave conditions in the area, in particular, the period of the waves. The period of the waves determines the length between successive crests, and the length of rotors 104 and 106 is preferably longer than the average length between successive crests for an area. This length selection for rotors 104 and 106 is to maximize the likelihood that rotors 104 and 106 are continuously fed water by the intermittent waves to achieve constant or near constant rotational speed of rotors 104 and 106 for consistent and steady power output.

Buckets 114 are arranged on cylinder 115 to maximize the likelihood that a force imbalance is created to turn rotors 104 and 106, as water enters buckets 114 through their open tops when the height of the water exceeds the height of buckets 114 and/or when the hydrostatic pressure of the water column opens the bottom of buckets 114 so that water can fill buckets 114 from below. Only the ramp-side buckets receive water, thereby creating a weight-induced force imbalance that causes rotors 104 and 106 to turn when a critical number of buckets 114 are filled or partially filled. The operation of turbine unit 102 is discussed in greater detail below.

Bucket rows 112 may be arranged in a spiral pattern, as shown in FIG. 4. In other embodiments, no spiral pattern is provided, and bucket rows 112 may be straight lines, stair-stepped, or have any other pattern known in the art. A spiral arrangement of buckets 114 positions buckets 114 with respect to the wave crests so that the height of buckets 114 above ramp 108 varies along the length of ramp 108. In other words, at any given point in time, water traveling along ramp 108 encounters some buckets 114 with their water side 144 top edges (shown in FIG. 6) positioned at or slightly beneath the wave crest and some buckets 114 with their water side 144 bottom edges positioned at or slightly above the wave crest. Additional buckets 114 may be positioned between these two extremes. Depending upon the height of the waves, all of these buckets may be filled, some of the buckets 114 may be filled, or only those buckets 114 having their water side 144 bottom edges at or slightly beneath ramp 108 may be filled.

As shown in FIGS. 5-9, buckets 114 are containers or receptacles configured to receive elevated water traveling along ramp 108. Buckets 114 generally include a water side 144, a rotor side 146, a front side 148, a rear side 150, and a bottom 152 connected to each other to form an open-topped container capable of transporting a fluid. Bucket sides 144, 146, 148, and 150 and portions of bottom 152 are preferably made from a strong and rigid material capable of long exposure to harsh oceanic conditions. Such materials may include stainless steel, polymers and other plastics, composite materials, and ceramics. Bucket sides 144, 146, 148, 150, and 152 may be made using any method known in the art, such as by machining, stamping, forging, molding, or the like. If not formed as a unitary piece, bucket sides 144, 146, 148, 150, and 152 may be attached to each other using any method known in the art, such as by welding.

Rotor side 146 is configured to be attached to cylinder 115. For example, rotor side 146 may be attached to cylinder using bolts 157. In the embodiment shown in FIG. 7, four bolts 157 are utilized. Bolts 157 are preferably made from a strong material resistant to corrosion, such as stainless steel, composite materials, or ceramics. Rotor side 146 is preferably configured with bolt holes through which bolts 157 are passed. In other embodiments, rotor side 146 may be provided with a lip or flange configured with bolt holes. In yet other embodiments, rotor side 146 may be welded or otherwise fixedly attached to cylinder 115. In another embodiment, rotor side 146 may be hingedly attached to cylinder 115 using any type of hinge known in the art, preferably with a biasing mechanism drawing bucket 114 toward cylinder 115. In one embodiment, the biasing mechanism may include a spring. A small amount of tilting of bucket 114 may be achieved with a hinged attachment. This tilting could assist in filling bucket 114 though its open top.

Figure 6:
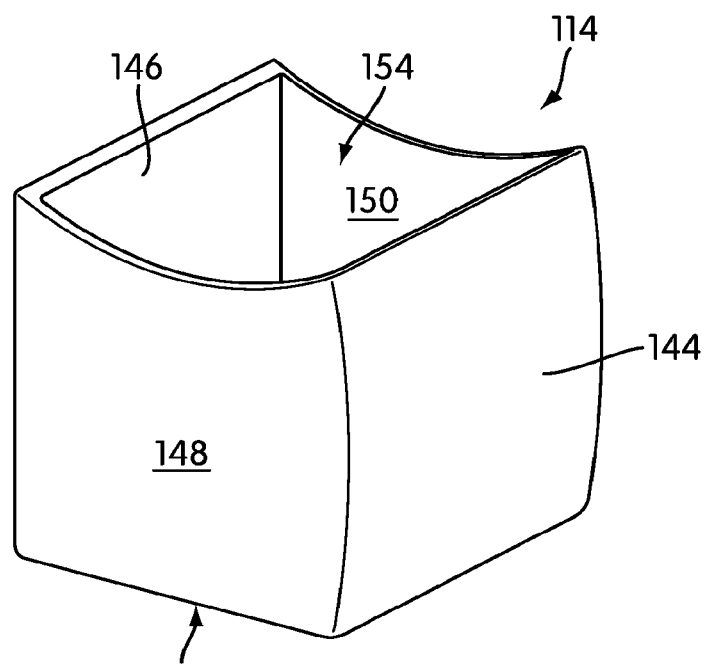
FIG. 6 is a schematic perspective view of a bucket of the generator unit.

Water side 144 of any bucket 114 is configured to face ramp 108 when the rotation of rotor 104 and 106 positions bucket 114 near ramp 108. The height of water side 144 is preferably selected to allow the majority of waves 103 in a region to spill over the top of water side 144 in order to fill bucket 114. In some embodiments, the height of water side 144 may be less than that of rotor side 146 to reduce the minimum wave height required to fill bucket 114. Additionally, as shown in FIG. 6, water side 144 is preferably curved to guide the water into bucket 114. However, in other embodiments, water side 114 may be flat.

Front side 148 and rear side 150 are configured to connect water side 144 and rotor side 146 in order to complete the preferably cubical shape of buckets 114. Front side 148 and rear side 150 are preferably flat so that adjacent buckets 114 on cylinder 115 may be tightly packed together and so that water may be directed axially to additional buckets. Preferably, the top edges of front side 148 and rear side 150 are curved to reduce the heights of sides 148 and 150. This curvature so that water in bucket 114 is guided to spill out through front side 148 and rear side 150 where the ambient water is highest.

Figure 7:
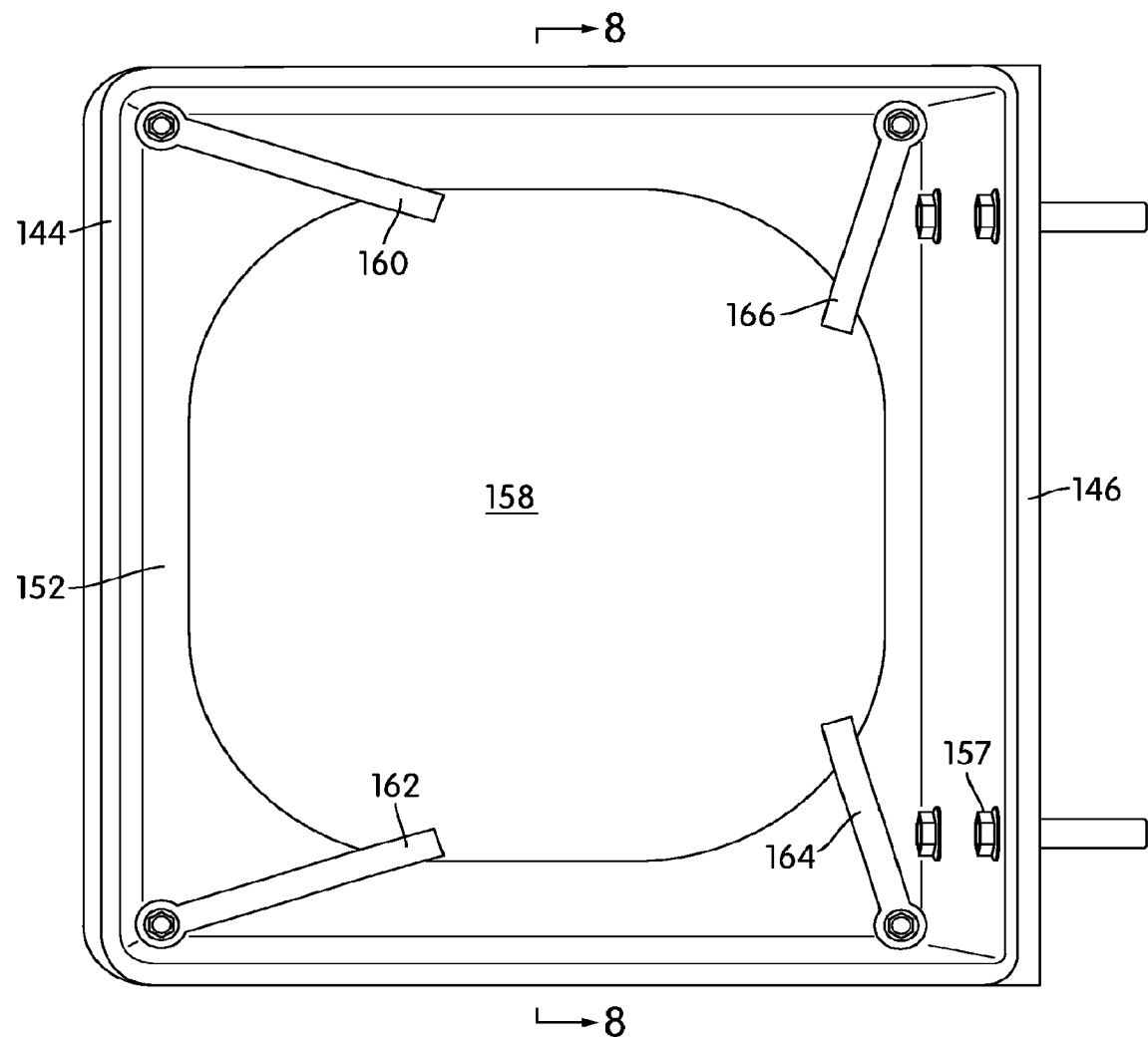
FIG. 7 is a schematic plan view of the bucket.
Figure 8:
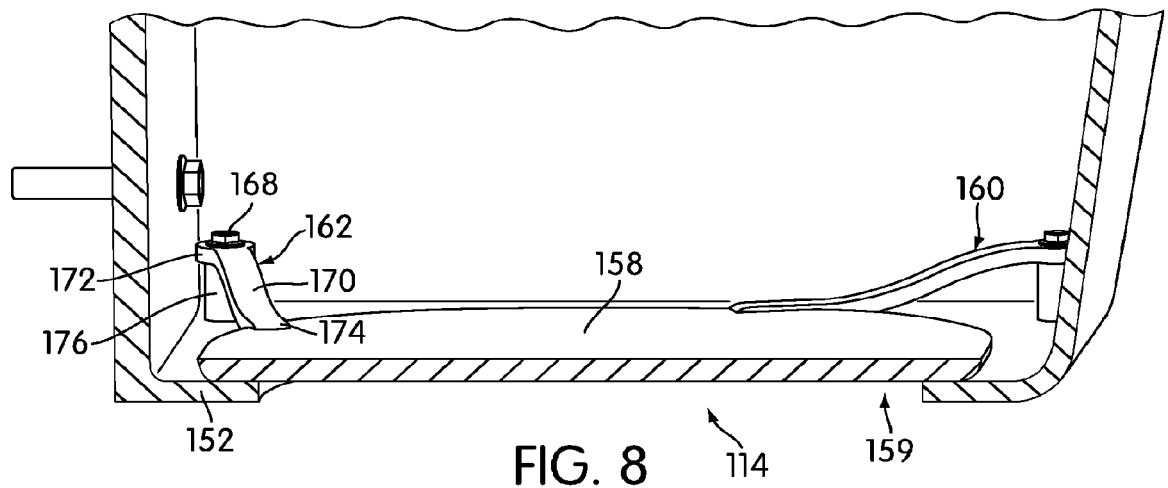
FIG. 8 is a cross-sectional view of the bucket showing a bottom flap in a closed position.
Figure 9:
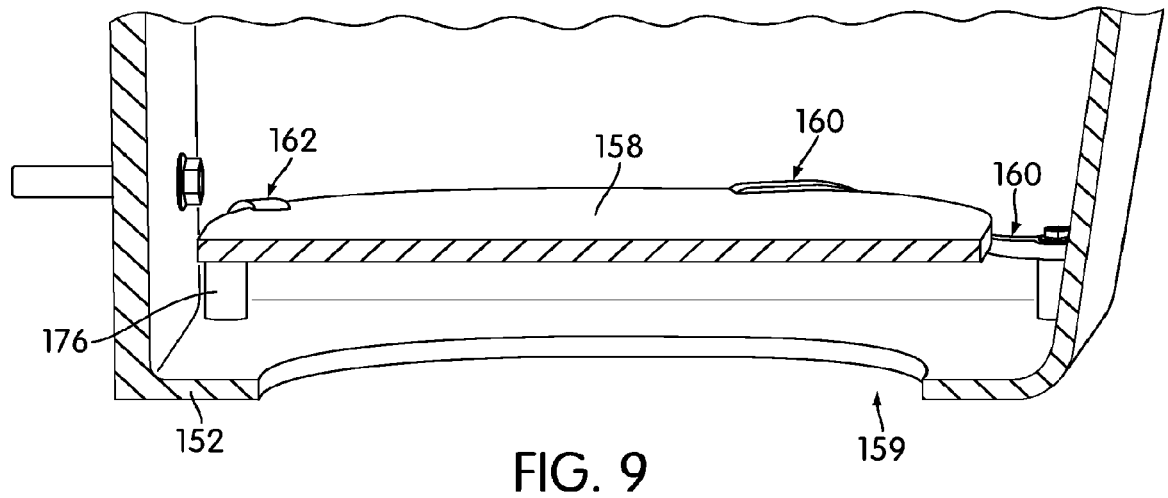
FIG. 9 is a cross-sectional view of the bucket showing the bottom flap in an open position.

As shown in FIGS. 7-9, bottom 152 is configured to allow water to fill buckets 114 when buckets 114 are positioned near ramp 108. A movable flap 158 controls the flow of water into and out of buckets 114 by alternately sealing and opening a opening 159 formed through bottom 152 of each bucket 114, as shown in FIGS. 8 and 9. In some bucket 114 orientations, such as when buckets 114 are positioned near ramp 108, flap 158 allows water to enter the buckets 114 when opening 159 is opened, such as by the hydrostatic pressure of the water column or the motion of buckets 114. This water accumulates within buckets 114, as the water is not expelled through the open top of buckets 114 by gravity and opening 159 is blocked, either by flap 158 or by additional incoming water. In other orientations, such as when buckets 114 have moved away from ramp 108, movable flap 158 prevents water from accumulating within buckets 114. For example, if a large wave were to wash over the entirety of turbine unit 102, only those buckets 114 toward ramp 108 would fill with water. The buckets 114 positioned away from ramp 108 are oriented so that flap 158 displaces to allow water to flow through opening 159 and not accumulate within buckets 114.

Additionally, the configuration of bottom 152 reduces the drag on buckets 114 as buckets 114 pass beneath surface 101, as water may flow through opening 159 and not around buckets 114. Further, the configuration of bottom 152 reduces drag on buckets 114 as buckets 114 are lifted out of the water. When attempting to pull a bucket with no flap 158 or opening 159 out of the water, a vacuum tends to form between the bucket and the surface. With opening 159 and an open flap 158, no vacuum can form, thereby reducing the amount of force required to lift the bucket out of the water.

In one embodiment, flap 158 is made from a rigid material, such as stainless steel, composite steel, molded plastic, and/or combinations of these materials. Flap 158 may be provided with an elastomeric gasket positioned between flap 158 and bottom 152 in order to enhance the sealing effect when flap 158 is in the closed position. In other embodiments, flap 158 may be made from or coated with a material that enhances the sealing capabilities of flap 158. For example, flap 158 may be a metal plate coated with a rubber, foam, or plastic covering. In other embodiments, flap 158 may be made from a slightly flexible rubber, foam, plastic plate, and/or combinations of these materials. In a preferred embodiment, for example, flap 158 is made of fiber-reinforced propylene having an elastomeric overmold, such as Hytrel®.

Flap 158 is preferably hingedly attached to bottom 152. In a preferred embodiment, shown in FIGS. 7-9, flap 158 has a quadrilateral shape with four elastomeric hinges 160, 162, 164, and 166. Furthermore, in other embodiments, flap 158 may have a different shape, so any number of elastomeric hinges may be provided for a secure attachment of flap 158 to bottom 152. In other embodiments, different types of hinges may be used, such as metal hinges, living hinges, or the like. Elastomeric hinges 160, 162, 164, and 166 may be made from any suitable material, such as silicon, stainless steel, natural or synthetic rubber, and/or combinations of these materials, such as Hytrel® reinforced with aircraft-grade cable. Elastomeric hinges 160, 162, 164, and 166 are configured with an elongated S-shape, as is best shown in FIG. 8.

Elastomeric hinges 160, 162, 164, and 166 are attached to bottom 152 at a first end 172 and to flap 158 at a second end 174, as shown in FIG. 8. Elastomeric hinges 160, 162, 164, and 166 may be attached to bottom 152 and flap 158 using any method known in the art, such as with mechanical fasteners, adhesives, or by welding. Preferably, both flap 158, an optional gasket (not shown) surrounding opening 159, and elastomeric hinges 160, 162, 164, and 166 are made of moldable or overmoldable materials so that flap 158 and elastomeric hinges 160, 162, 164, and 166 may be co-molded, two-shot molded, or insert molded. Furthermore, as shown, first end 172 of elastomeric hinges 160, 162, 164, and 166 are configured to be bolted to bottom 152, such as by forming a bolt hole through first end 172. A flap bolt 168 passes through this bolt hole and into a threaded bolt receptacle 176 formed with or attached to bottom 152.

In operation, bottom 152 has the configuration shown in FIG. 8 when buckets 114 are positioned toward ramp 108 in anticipation of being filled by a wave 103. Flap 158 rests against bottom 152 and lightly seals opening 159 formed in bottom 152. If a wave 103 were to introduce water into bucket 114 at this point, the force of the water would hold flap 158 in position to minimize water leakage through opening 159.

As rotors 104 and 106 turn, however, the water-filled buckets may become submerged. Furthermore, water may accumulate on or in the non-ramp-side buckets during rotation if large waves ride over rotors 104 and 106. As the rotation of rotors 104 and 106 depend upon a weight imbalance between the ramp-side buckets and the non-ramp-side buckets, such an accumulation would inhibit the turning of rotors 104 and 106. Therefore, when water pushes against bottom 152 and flap 158 from outside of bucket 114, the force of the water causes elastomeric hinges 160, 162, 164, and 166 to deform so that flap 158 lifts away from bottom 152. As shown in FIG. 9, opening 159 is thus opened, allowing water to flow through bucket 114.

In addition to aiding with the hydrodynamic operation of rotors 104 and 106, flap 158 and elastomeric hinges 160, 162, 164, and 166 also help to prevent the accumulation of debris, such as seaweed, within buckets 114. If some debris were to become trapped between flap 158 and bottom 152, elastomeric hinges 160, 162, 164, and 166 may flex to accommodate the debris locally. While a bucket 114 with trapped debris may leak slightly, such a bucket would still be able to carry a portion of water to maintain the weight imbalance. Additionally, as rotors 104 and 106 move beneath surface 101, flap 158 opens completely, and the water flowing through flap 158 may wash the debris clear of turbine unit 102 within a few cycles of rotors 104 and 106.

Figure 10:
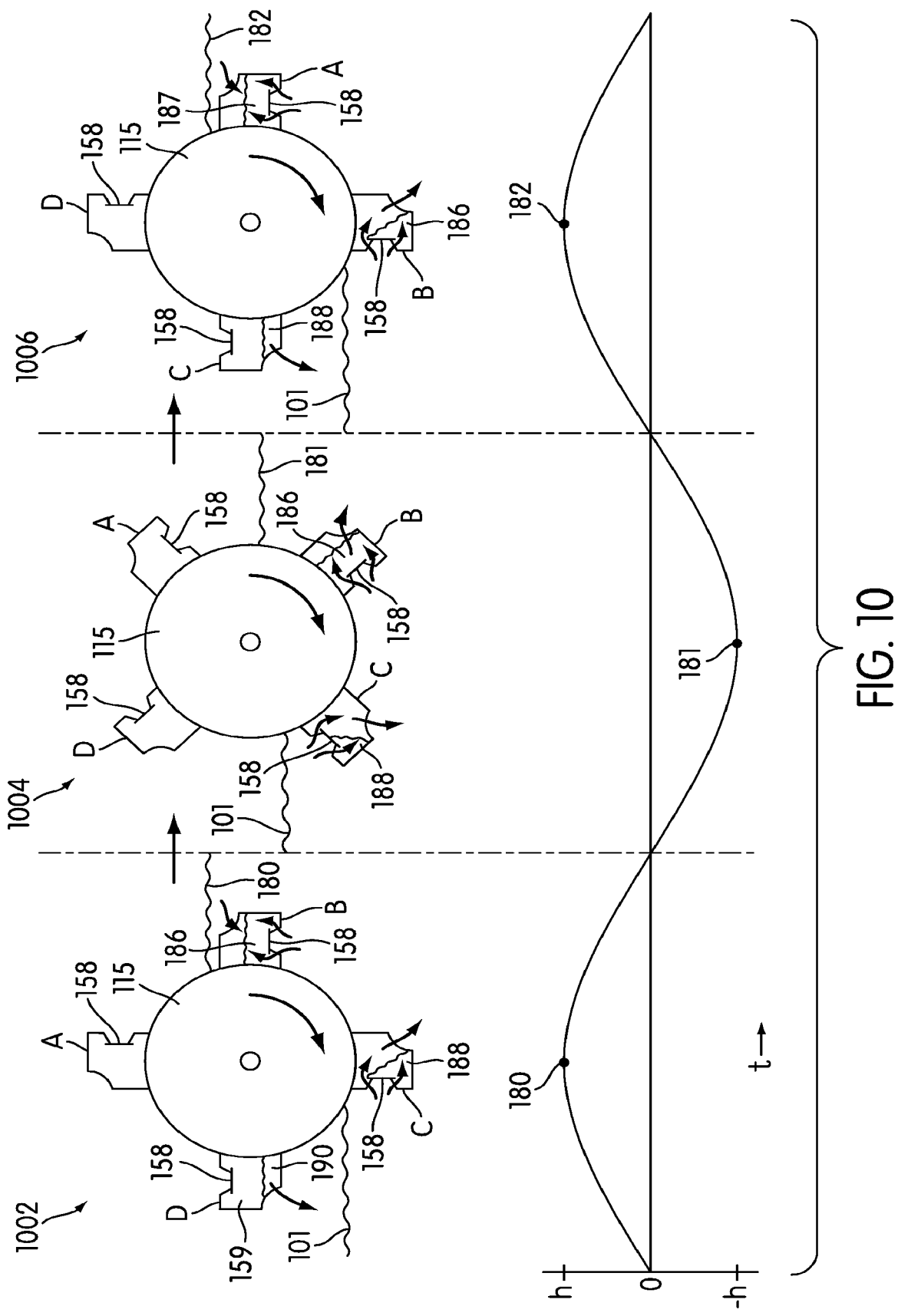
FIG. 10 is a schematic drawing of a simplified rotor in operation.

FIG. 10 demonstrates the operation of one rotor of a turbine unit. In this simplified scenario, a cylinder 115 has only four buckets A, B, C, and D, positioned orthogonally around cylinder 115. In an initial position 1002, first bucket A is positioned near the top of cylinder 115, second bucket B is positioned on ramp-side (the ramp is not shown for clarity), third bucket C is submerged and near the bottom of cylinder 115, and fourth bucket D is positioned opposite to second bucket B, just above surface 101. A series of waves 180, 181, and 182 pass by cylinder 115. As first wave 180 encounters the turbine unit, the ramp guides the water into second bucket B, which fills with a first portion 186 of water. A first residual portion 188 of water is flowing out of third bucket C, and a second residual portion 190 of water is draining from fourth bucket D. Because a flap 158 such as those described above with respect to FIGS. 7-9 is used to control opening 159, water is flowing through third bucket C to reduce drag. No water remains in first bucket A. The weight of the first portion 186 of water in second bucket B creates a force imbalance on cylinder 115, as none of the other buckets A, C, D contain sufficient water to balance first portion 186 of water. Cylinder 115 turns in the direction indicated by the arrow.

Figure 11:
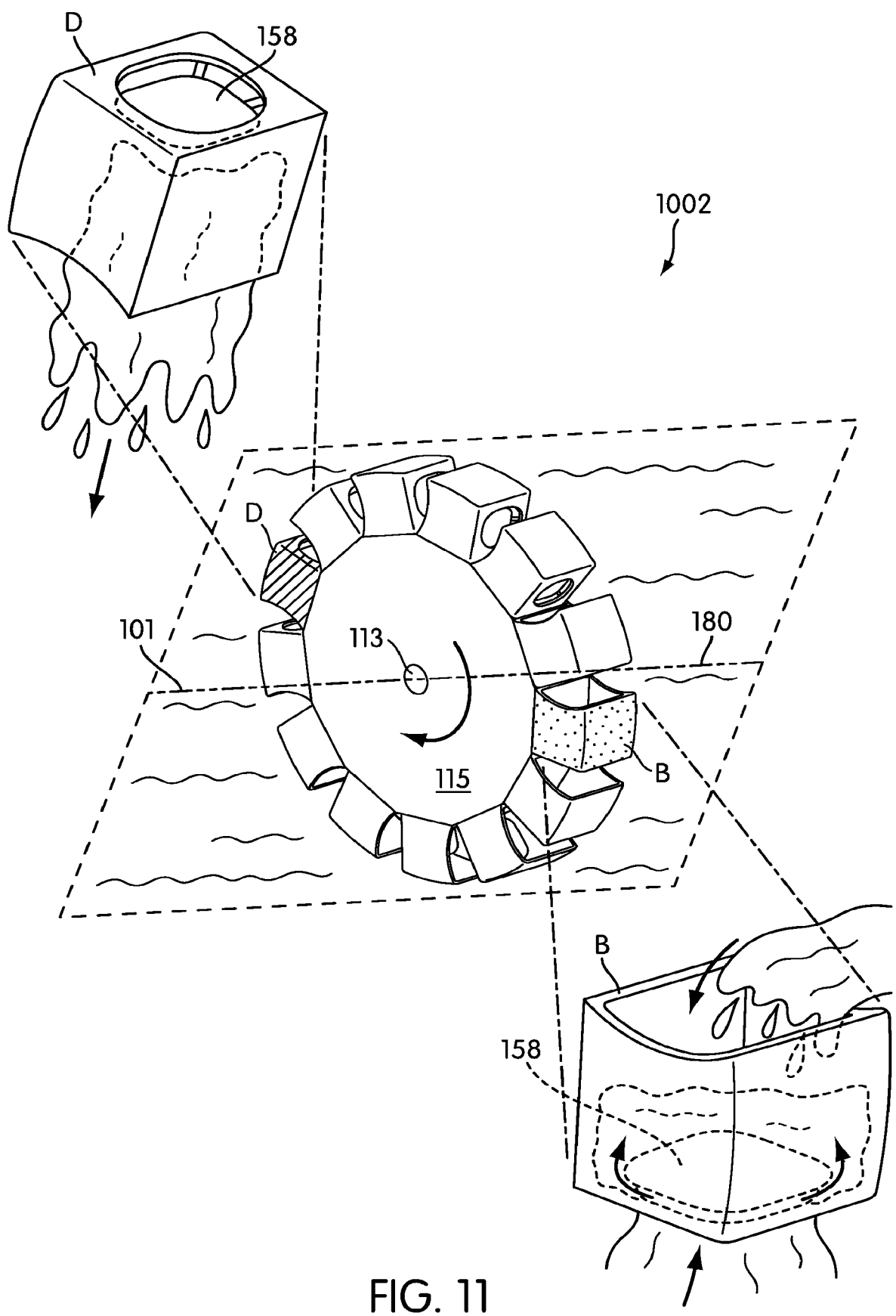
FIG. 11 is a schematic drawing of a simplified rotor in an initial position, with opposing buckets enlarged.

FIG. 11 details second bucket B and fourth bucket D in initial position 1002 on a section of cylinder 115 with a full complement of buckets. As shown, wave 180 raises the height of the water above surface 101 on one side of cylinder, submerging or partially submerging second bucket B. Fourth bucket D remains above surface 101. Flap 158 opens so that water flows into second bucket B through both the open top and the open bottom.

As cylinder 115 turns to second position 1004, second bucket B fully submerges, and first portion 186 begins to exit second bucket B. Third bucket C is moved toward surface 101, and second portion 188 is reduced further as water flows through third bucket C. At this point, both buckets D and A are empty. Cylinder 115 continues to turn due to the weight of water in second bucket B creating a force imbalance, as none of the other buckets A, C, D contain sufficient water to balance first portion 186. The momentum of cylinder 115 due to the initial turning continues to move cylinder 115 as well.

Figure 12:
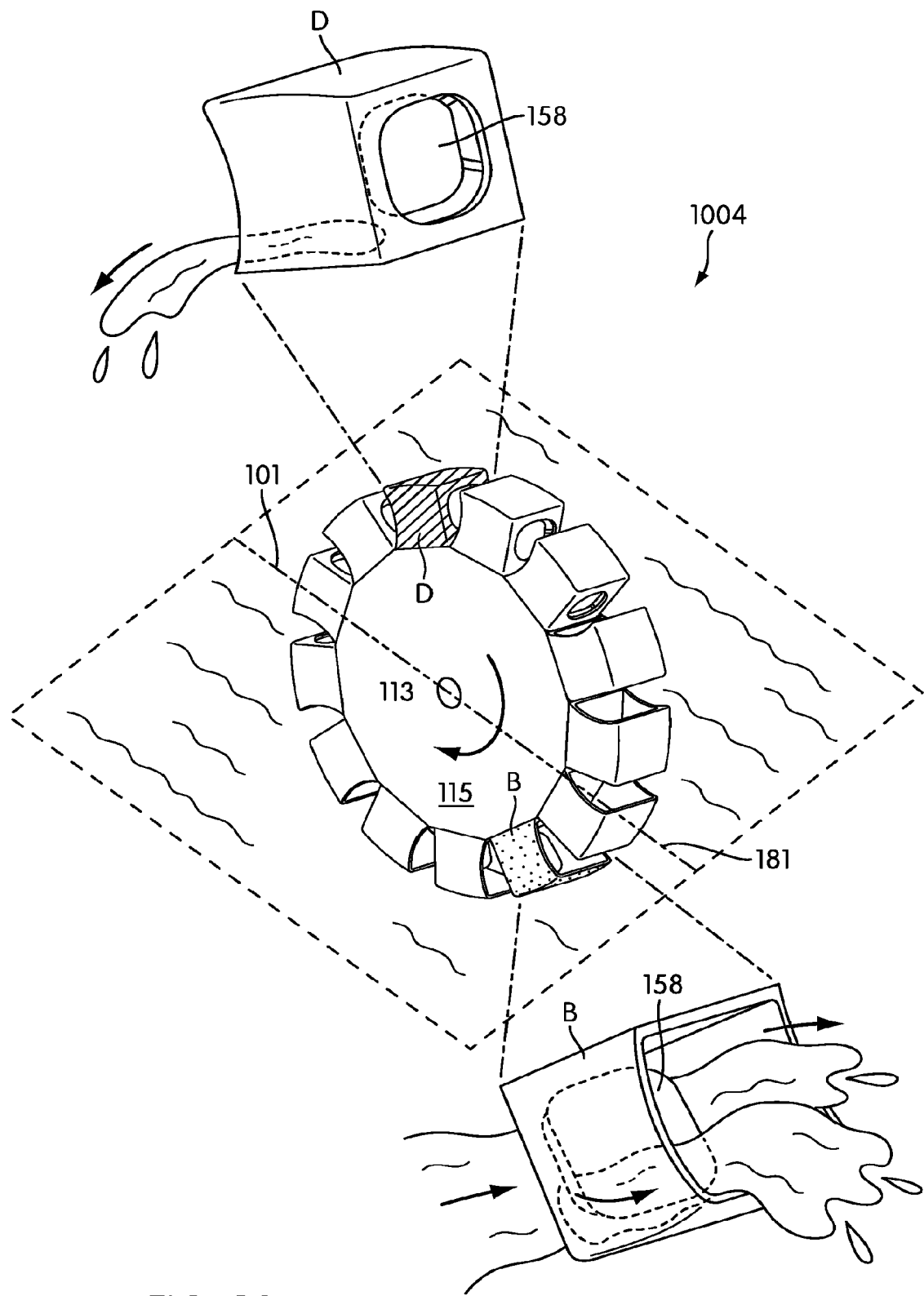
FIG. 12 is a schematic drawing of the simplified rotor in a second position, with opposing buckets enlarged.

FIG. 12 shows second bucket B and fourth bucket D on cylinder 115 in second position 1004. As shown, wave trough 181 allows the water on the ramp side of cylinder 115 to level or substantially level with surface 101. Second bucket B is submerged and passes through water. Flap 158 remains open so that water can flow through second bucket B more easily, thereby reducing drag on second bucket B. Fourth bucket D travels toward the top of cylinder 115. Any remaining water within fourth bucket D empties. Flap 158 may be open to reduce air drag on fourth bucket D as fourth bucket D moves toward the top of cylinder 115.

Cylinder 115 continues to turn to third position 1006. Second bucket B is submerged and first portion 186 exits second bucket B as water continues to flow through open flap 158 and out of the open top of second bucket B. Third bucket C surfaces and is lifted away from surface 101 so that any residual water remaining within third bucket C is drained. First bucket A is positioned on the ramp side of cylinder 115. Empty fourth bucket D is rotated to the top of cylinder 115. At this point, a second wave 182 travels up the ramp. Second wave 182 fills first bucket A with a second portion 187 of water, creating a similar force imbalance as described above when second bucket B was filled with first portion 186 of water. Thus, cylinder 115 again turns in the direction indicated by the arrow.

Figure 13:
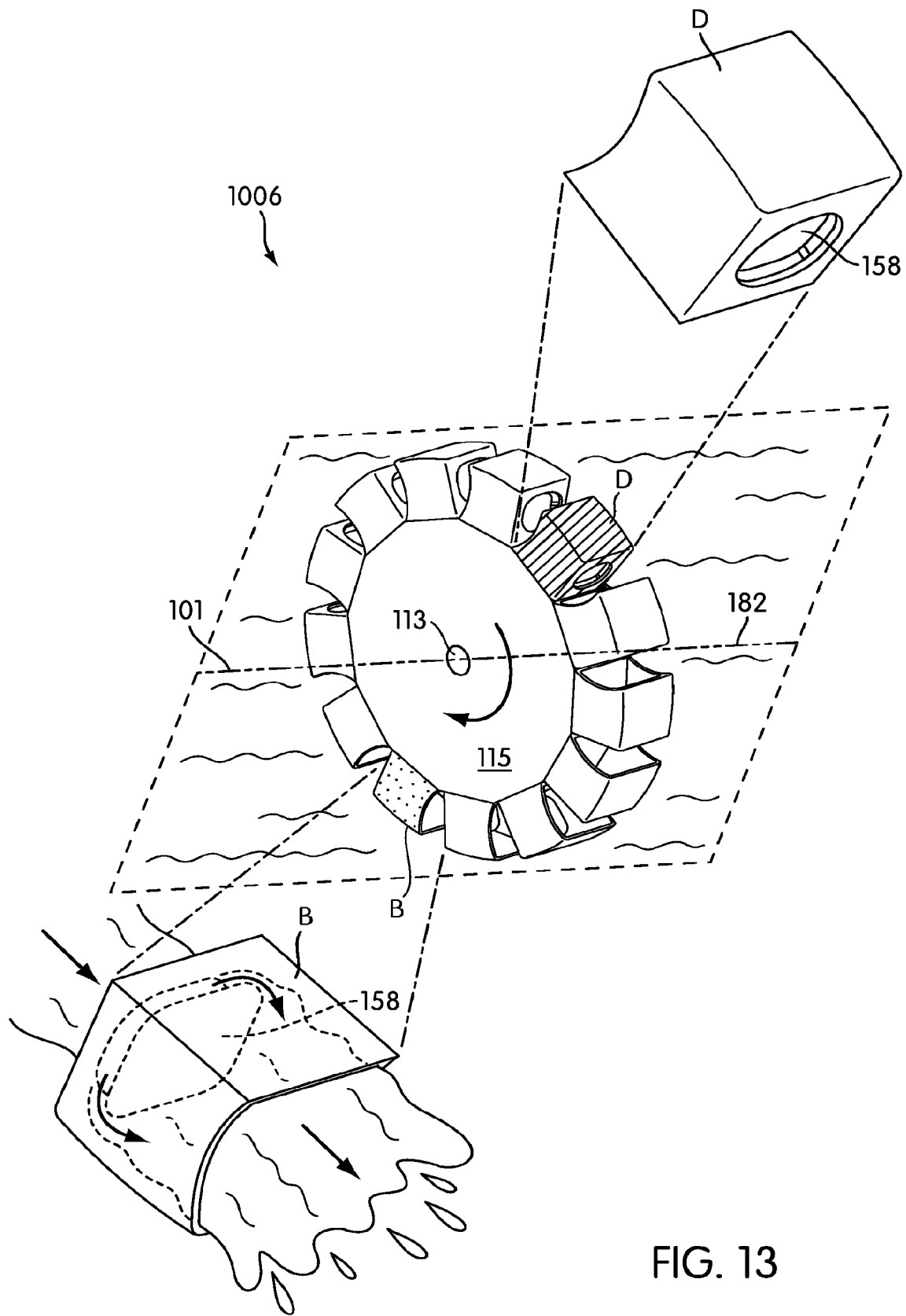
FIG. 13 is a schematic drawing of the simplified rotor in a third position, with opposing buckets enlarged.

FIG. 13 shows second bucket B and fourth bucket D on cylinder 115 in third position 1006. As shown, second wave crest 182 again raises the height of the water above surface 101. Second bucket B continues to pass through the water. Flap 158 remains open so that water can flow through second bucket B more easily, thereby reducing drag on second bucket B. Fourth bucket D is now positioned at or near the top of cylinder 115. Flap 158 is preferably closed or closing so that fourth bucket D is able to capture and retain water as soon as fourth bucket D begins to travel toward the water again.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A system for converting water wave energy to electricity comprising:
   a first rotor having a first plurality of water receptacles attached to a first rotor cylinder;
   the first rotor configured to rotate in a first direction when a critical number of water receptacles receive water from a water wave;
   each water receptacle having an open top and a hinged flap on an opposite side to the open top, the hinged flap configured to seal an opening formed in the opposite side if water enters the receptacle through the open top and to open if water attempts to enter the receptacle through the opening;
   a first generator connected to the first rotor and configured to convert the rotational energy of the first rotor into electricity; and
   a transmission line connected to the first generator and configured to transfer the electricity to an external collection area.

2. The system of claim 1 further comprising a second rotor having a second plurality of water receptacles attached to a second rotor perimeter;
   the second rotor configured to rotate in a second direction when the critical number of the second plurality of water receptacles receive water from a water wave;
   each water receptacle having an open top and a hinged flap on an opposite side to the open top, the hinged flap configured to seal if water enters the receptacle through the open top and to open if water attempts to enter the receptacle through the opposite side;
   a second generator connected to the second rotor and configured to convert the rotational energy of the second rotor into electricity, the transmission line being connected to the second generator; and
   a ramp positioned between and connected to the first rotor and the second rotor.

3. The system of claim 2, the first rotor and the second rotor being connected to the ramp so that a first angle is formed between the first rotor and the second rotor.

4. The system of claim 3, wherein a ramp width varies along a ramp length.

5. The system of claim 2, the first rotor and the second rotor being connected to the ramp so that a first end of the ramp and a second end of the ramp are open to the flow of water.

6. The system of claim 2, the first rotor and the second rotor being connected to the ramp at a second angle so that the ramp forms an incline between the rotors.

7. The system of claim 2, wherein the first direction is opposite to the second direction.

8. The system of claim 2, wherein the first generator is connected to the first rotor by a first drive driveshaft and the second generator is connected to the second rotor by a second drive driveshaft.

9. The system of claim 2, wherein at least one of the first rotor or the second rotor is connected to a third generator by a third drive driveshaft.

10. The system of claim 1, wherein the transmission line connects the first rotor to an energy collection and distribution center.

11. The system of claim 1, wherein the water receptacles are arranged on the first rotor cylinder in rows that form a spiral pattern on the cylinder.

12. A bucket for a water wheel comprising:
    an open top configured to allow water to flow into the bucket;
    a first side opposite the open top;
    a flap hingedly attached to the first side; and
    the flap configured to seal an opening formed in the first side if water enters the bucket through the open top and to open if water attempts to enter the bucket through the opening.

13. The bucket of claim 12, the bucket having a substantially cubical shape.

14. The bucket of claim 12, further comprising at least one hinge attaching the flap to the first side.

15. The bucket of claim 14, the hinge comprising an elastomeric material.

16. The bucket of claim 15, the flap having a quadrilateral shape.

17. The bucket of claim 16, wherein an elastomeric hinge is provided on each side of the quadrilateral flap.

18. The bucket of claim 12, wherein the flap comprises a rigid material.

19. The bucket of claim 18, wherein the flap includes an elastomeric material.

20. The bucket of claim 12, wherein the flap comprises a flexible material.

21. The bucket of claim 12, wherein the bucket is fixedly attached to a water wheel cylinder.

22. A method for generating energy using water waves comprising: positioning a turbine unit at or near a water surface, the turbine unit comprising a first rotor having a first plurality of buckets attached to a first rotor cylinder, wherein each bucket in the first plurality of buckets includes an opening and a flap hingedly attached to the bucket, wherein the flap is configured to seal the opening, a second rotor having a second plurality of buckets attached to a second rotor cylinder, wherein each bucket in the second plurality of buckets includes an opening and a flap hingedly attached to the bucket, wherein the flap is configured to seal the opening, and a ramp connected to and positioned between the first rotor and the second rotor; orienting the turbine unit so that a first end of the ramp is exposed to an oncoming wave; capturing at least a portion of the oncoming wave so that water associated with the oncoming wave travels along the ramp to be fed into at least one of the first or second plurality of buckets to create a weight imbalance on at least one of the first or second rotors to cause at least one rotor to turn; and driving a generator with the at least one turning rotor to generate energy.

23. The method of claim 22, wherein the turning rotor drives a driveshaft.

24. The method of claim 22, further comprising transmitting the energy generated by the generator to an external collection point via a transmission line.

25. The method of claim 24, further comprising anchoring the turbine unit with an anchoring line.

* * * * *